United States Patent
Ryshakov et al.

(10) Patent No.: US 9,292,344 B2
(45) Date of Patent: Mar. 22, 2016

(54) RESERVATION SCHEDULER FOR REAL-TIME OPERATING SYSTEMS IN WIRELESS SENSOR NETWORKS

(71) Applicant: Cubic Corporation, San Diego, CA (US)

(72) Inventors: Igor Ryshakov, Mountain View, CA (US); Georgi Danielyan, Yereven (AM); Anatoli Gostev, San Jose, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/256,346

(22) Filed: Apr. 18, 2014

(65) Prior Publication Data

US 2014/0317631 A1    Oct. 23, 2014

Related U.S. Application Data

(60) Provisional application No. 61/814,091, filed on Apr. 19, 2013.

(51) Int. Cl.
*G06F 9/46* (2006.01)
*G06F 9/48* (2006.01)
*G06F 9/50* (2006.01)

(52) U.S. Cl.
CPC .............. *G06F 9/4881* (2013.01); *G06F 9/48* (2013.01); *G06F 9/4806* (2013.01); *G06F 9/4843* (2013.01); *G06F 9/4887* (2013.01);
(Continued)

(58) Field of Classification Search
None
See application file for complete search history.

(56) References Cited

U.S. PATENT DOCUMENTS

| | | | |
|---|---|---|---|
| 7,159,218 B2* | 1/2007 | Abe | G06F 9/4881 718/102 |
| 7,165,252 B1* | 1/2007 | Xu | G06F 9/4887 718/100 |

(Continued)

FOREIGN PATENT DOCUMENTS

| | | |
|---|---|---|
| CN | 101271406 A | 9/2008 |
| EP | 2256632 A1 | 12/2010 |

(Continued)

OTHER PUBLICATIONS

Rowe, A., et al., "FireFly Mosaic: A Vision-Enabled Wireless Sensor Networking System", Real-Time Systems Symposium: 28th IEEE International, *IEEE*, Piscataway, NJ, USA. Dec. 2007, all pages.

(Continued)

*Primary Examiner* — Charles Swift
(74) *Attorney, Agent, or Firm* — Kilpatrick Townsend & Stockton LLP

(57) ABSTRACT

A method of scheduling tasks for a Real-Time Operating System (RTOS) in a low-power, wireless, mesh network may include receiving, at a scheduler for the RTOS, a plurality of tasks to schedule for execution by one or more processors. The plurality of tasks may include a first task; the first task may be associated with an expected execution interval; and the expected execution interval may indicate an expected length of time for the one or more processors to execute the first task. The method may also include scheduling the plurality of tasks for execution by the one or more processors. The first task may be scheduled using the expected execution time such that the first task is executed without being interrupted by others of the plurality of tasks.

18 Claims, 9 Drawing Sheets

(52) U.S. Cl.
CPC .............. *G06F 9/50* (2013.01); *G06F 9/5005* (2013.01); *G06F 9/5016* (2013.01); *G06F 9/5027* (2013.01); *G06F 9/5038* (2013.01); *G06F 9/5055* (2013.01); *Y02B 60/144* (2013.01)

(56) References Cited

U.S. PATENT DOCUMENTS

| | | | | |
|---|---|---|---|---|
| 2002/0194248 | A1* | 12/2002 | Wood et al. | 709/102 |
| 2003/0115239 | A1* | 6/2003 | Togawa | 709/102 |
| 2003/0217125 | A1* | 11/2003 | Brancati et al. | 709/220 |
| 2004/0015973 | A1* | 1/2004 | Skovira | 718/103 |
| 2004/0194107 | A1* | 9/2004 | Masuoka | 718/100 |
| 2004/0226013 | A1* | 11/2004 | Mariotti et al. | 718/100 |
| 2005/0028160 | A1* | 2/2005 | Cofer et al. | 718/100 |
| 2007/0006229 | A1* | 1/2007 | Moore | 718/100 |
| 2008/0155550 | A1* | 6/2008 | Tsafrir et al. | 718/103 |
| 2009/0300633 | A1* | 12/2009 | Altrichter et al. | 718/103 |
| 2010/0088706 | A1* | 4/2010 | Dong et al. | 718/103 |
| 2012/0307676 | A1 | 12/2012 | Chan et al. | |
| 2013/0007754 | A1* | 1/2013 | Chu et al. | 718/103 |

FOREIGN PATENT DOCUMENTS

| | | |
|---|---|---|
| WO | 2013/000689 A1 | 1/2013 |
| WO | 2014/172597 A1 | 10/2014 |

OTHER PUBLICATIONS

Bocchino, S., et al., "SPEED routing protocol in 6LoWPAN networks", Emerging Technologies & Factory Automation (ETFA: 2011 IEEE 16Conference on, *IEEE*. Sep. 2011, all pages.

Seema, A., et al., "Towards Efficient Wireless Video Sensor Networks: A Survey of Existing Node Architectures and Proposal for a Flexi-WVSNP Design", IEEE Communication Surveys, *IEEE*, New York, NY, US. Jul. 2011, vol. 13, No. 3, all pages.

Wan, J., et al., "Multi-Robots' Communication System Based on ZigBee Network", 9th International Conference on Electronic Measurement & Instruments, 2009: ICEMI '09; Aug. 16-19, 2009, Beijing, China; Proceedings, *IEEE*, Piscataway, NJ, USA. Aug. 2009, all pages.

ISR/WO mailed on Sep. 4, 2014 for International Patent Application No. PCT/US2014/034591 filed on Apr. 18, 2014, all pages.

* cited by examiner

RESERVATION SCHEDULER FOR REAL-TIME OPERATING SYSTEMS IN WIRELESS SENSOR NETWORKS

CROSS-REFERENCES TO RELATED APPLICATIONS

The present application claims benefit under 35 USC 119 (e) of and is a nonprovisional of U.S. Provisional Patent Application No. 61/814,091, filed Apr. 19, 2013, entitled "RESERVATION SCHEDULER FOR REAL-TIME OPERATING SYSTEMS IN WIRELESS SENSOR NETWORKS," the entire contents of which are incorporated by reference herein for all purposes.

STATEMENT AS TO RIGHTS TO INVENTIONS MADE UNDER FEDERALLY SPONSORED RESEARCH AND DEVELOPMENT

This invention may have been made with government support under contract ARINC 400-10. The government may have certain rights in the invention.

BACKGROUND

Wireless mesh networks have become an important part of modern communication infrastructures. Wireless devices, such as cellular phones, sensor units, recording devices, or camera units can be used to provide information from many disparate locations for data analysis and retransmission. Because these wireless devices often communicate in a time sensitive manner, a real-time operating system (RTOS) may be used. An RTOS is an operating system that services real-time application requests in order to meet hard and/or soft deadlines. Algorithms for scheduling, known as schedulers, may be used to orchestrate computer system usage and process priorities. Using an RTOS in a low-power, mobile device can be used to reduce power consumption while simultaneously maintaining sensor sampling and transmission schedules.

BRIEF SUMMARY

In some embodiments, a method of scheduling tasks for a Real-Time Operating System (RTOS) in a low-power, wireless, mesh network may be presented. The method may include include receiving, at a scheduler for the RTOS, a plurality of tasks to schedule for execution by one or more processors. The plurality of tasks may include a first task; the first task may be associated with an expected execution interval; and the expected execution interval may indicate an expected length of time for the one or more processors to execute the first task. The method may also include scheduling the plurality of tasks for execution by the one or more processors. The first task may be scheduled using the expected execution time such that the first task is executed without being interrupted by others of the plurality of tasks.

In some embodiments, a low-power wireless sensor device running a Real-Time Operating System (RTOS) may be presented. The sensor device may include a wireless communication module, one or more processors, and a memory having instructions stored thereoen which, when executed by the one or more processors, cause the one or more processors to perform operations including receiving, at a scheduler for the RTOS, a plurality of tasks to schedule for execution by one or more processors. The plurality of tasks may include a first task; the first task may be associated with an expected execution interval; and the expected execution interval may indicate an expected length of time for the one or more processors to execute the first task. The operations may also include scheduling the plurality of tasks for execution by the one or more processors. The first task may be scheduled using the expected execution time such that the first task is executed without being interrupted by others of the plurality of tasks.

In some embodiments, a non-transitory, computer-readable storage medium having instructions stored thereon may be presented. The instructions, when executed by one or more processors, may cause the one or more processors to perform operations including receiving, at a scheduler for the RTOS, a plurality of tasks to schedule for execution by one or more processors. The plurality of tasks may include a first task; the first task may be associated with an expected execution interval; and the expected execution interval may indicate an expected length of time for the one or more processors to execute the first task. The operations may also include scheduling the plurality of tasks for execution by the one or more processors. The first task may be scheduled using the expected execution time such that the first task is executed without being interrupted by others of the plurality of tasks.

Various embodiments may also incorporate one or more the following features any combination and without limitation. The plurality of tasks may include a second task. The second task may be associated with an execution time. The execution time may indicate a time when the one or more processors should begin executing the second task. The second task may be scheduled using the execution time such that the second task is executed without being interrupted by others of the plurality of tasks. The method/operations may further include determining that the second task cannot be scheduled to execute at the execution time and executing a callback function to provide a notification that the second task cannot be scheduled to execute at the execution time. Each of the plurality of tasks may be associated with respective priorities. Each of the plurality of tasks may be scheduled for execution by the one or more processors according to their respective priorities. Scheduling each the plurality of tasks according to their respective priorities may cause the second task to miss the execution time. The RTOS might not allow preemption. The first task may be associated with a priority. The priority may indicate a scheduling priority relative to others of the plurality of tasks. The first task may be scheduled using the priority. The expected execution interval may be provided to the scheduler by an application associated with the first task. The expected execution interval may be estimated by the scheduler based on previous executions of the first task. The RTOS may allow preemption. Each of the plurality of tasks may declare resource identifiers for required resources. The first task may be scheduled to use a first resource based on the expected execution time.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
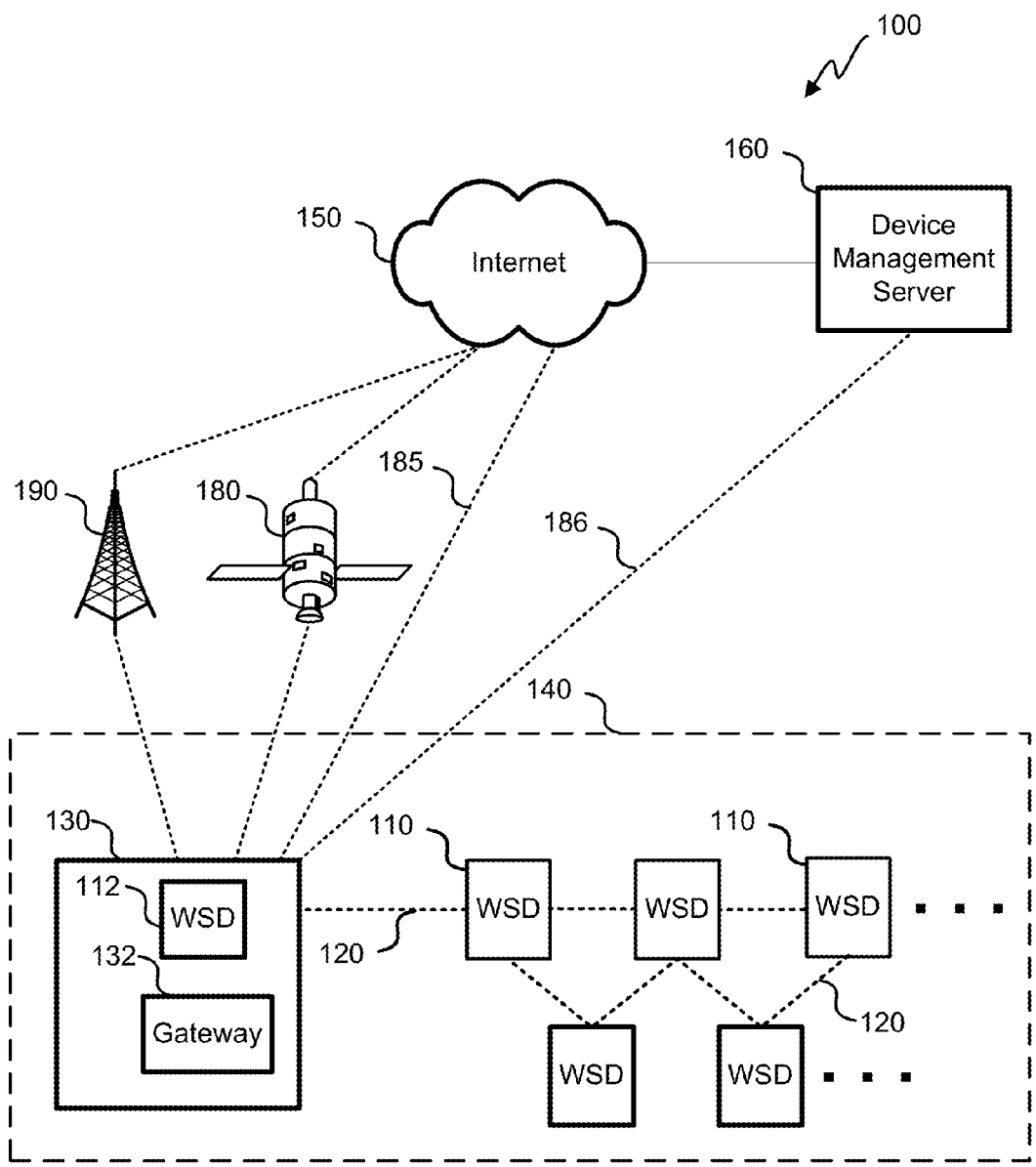
FIG. 1 illustrates a block diagram of a wireless network, according to some embodiments.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein are embodiments for scheduling tasks for a real-time operating system (RTOS) using estimated execution intervals that represent lengths of time needed for one or more processors to execute each task. By associating an expected execution interval with each task to be scheduled, a scheduler can more efficiently use coputational resources to ensure that high priority tasks are executed without interruption. Context switching delays can also be minimized. In some embodiments, tasks to be scheduled can be divided into two groups, known as WALK-IN tasks and EXACT tasks. EXACT tasks can be associated with an execution time that represents a specific time at which the particular EXACT task needs to begin or end processing. WALK-IN tasks are not associated with an execution time, but can instead be scheduled according to the execution interval and a priority. When receiving tasks, a scheduler can determine whether the task should be classified as an EXACT task or a WALK-IN task, and then schedule the task according to its priority, execution interval, and/or execution time, depending on the particular embodiment. In an RTOS that allows preemption, tasks can be scheduled as usual based on task priorities. However, mutually exclusive code sections can be guarded using semaphores. Each WALK-IN task may advertise any required resources, and the scheduler can use the expected execution time to schedule access to the mutually exclusive code. Some embodiments can determine when an EXACT task cannot be scheduled, and a notification can then be sent indicating that the EXACT task needs to be rescheduled.

It should be noted that the scheduling principles described herein for an RTOS can be applicable to any system. Merely by way of example, the embodiments described herein may make specific reference to a wireless sensor network. While these embodiments may be particularly advantageous to wireless sensor devices, the invention is not so limited. In light of this disclosure, these embodiments can also be applied to real-time operating environments and processors used in any number of different applications, such as mobile computing devices, cellular telephones, PDAs, tablet computers, national security and defense systems, and/or the like. Therefore, the wireless sensor networks described herein should be interpreted broadly and are not meant to be limiting. Rather, they are used to provide an enabling disclosure for one having skill in the art.

Wireless networks may include may different types of wireless network devices. What are referred to herein as wireless sensor devices (WSDs) may include sensor units used in applications such as asset tracking, security systems, smart home devices, military systems, and/or the like. In some embodiments, WSDs may include cellular telephones, smart phones, PDAs, and/or the like connected through a cellular network. In some cases, smart phones and other WSDs may be connected through local networks or directly to each other without traveling through a base station, gateway, and/or the like.

Wireless networks may be configured in a variety of ways and in a variety of contexts. Example configurations include mesh, point-to-point, and/or ad hoc networks, among others. The flexible nature of these networks—enabling network devices, or nodes, to join and leave these networks dynamically—together with WSDs configured to collect and communicate sensor information, enables these networks to provide end-to-end flexibility that may be essential for ad hoc situations. Although disclosed embodiments focus on wireless technologies, the techniques described herein can be applied to wired communication networks, such as an ad-hoc serial interface, for example.

In one exemplary embodiment, a wireless network can comprise a plurality of WSDs providing sensor information relating to a plurality of cargo containers located in a depot. The sensor information can include data from a variety of sensors, which can indicate the temperature and/or humidity of a container, whether the container door is or has been opened, whether the container is experiencing or has experienced a shock, the location of the container, whether the container is moving, and more. The wireless network further can include a gateway device that collects the sensor information and provides it to systems outside the wireless network. As WSD-equipped containers enter and leave the depot, the wireless network will adjust accordingly, enabling WSDs of containers entering the depot to join the wireless network while the WSDs of containers leaving the depot are dropped from the wireless network. Furthermore, WSDs can act as routers to relay sensor information from other WSDs that are not in direct communication with the depot's gateway device.

Low-power wireless networks can be advantageous in transportation, logistical, and similar applications where network devices are mobile devices operating on battery power. Although many battery-operated mobile devices utilize wireless technologies, most mobile devices exhaust their batteries in a matter of hours or days. The term "low-power wireless networks" as used herein refers to wireless networks utilizing technologies that enable battery-powered devices to operate for approximately a year or more without exhausting their batteries. This can include technologies associated with the IEEE 802.15.4 and/or ISO/IEC 18000-7 standards, as well as various proprietary technologies, among others.

FIG. 1 illustrates a block diagram of a wireless network 100, according to some embodiments. In this type of embodiment, a plurality of WSDs 110 may be networked together to generate and communicate data. A WSD 110 gathering sensor information (such as cellular voice or data transmissions, environmental conditions, security information, etc.) can communicate the sensor information toward a network interface 130 using a wireless connection 120. If there are one or more WSDs 110 communicatively linked between the WSD 110 originating the sensor information and the network interface 130, the one or more WSDs 110 can relay the sensor information until it reaches the network interface 130. The wireless network 100 depicted in FIG. 1 is shown as an example and is not meant to be limiting. A sensor network 140 can be configured in a variety of ways. For instance, the network interface 130 can connect with multiple WSDs 110, and WSDs 110 can have more or fewer wireless connections 120 than indicated in FIG. 1. Moreover, multiple network interfaces 130 and/or sensor networks 140 may be included in a logistical management system 100.

In some embodiments, the network interface 130 may comprise a gateway 132 configured to receive information for multiple WSDs 110. In other embodiments, the network interface 130 may simply comprise one of the WSDs 112 in the sensor network 140. In other configurations, each WSD 110 may act as a network interface 130 at different times and in different circumstances. This may allow the sensor network 140 to recover gracefully when one of the WSDs 110 drops out of the sensor network 140.

The network interface 130 may provide connectivity between sensor network 140 and a device management system (DMS) 160. Communication between the network interface 130 and the DMS 160 can be relayed through the Internet 150, or any other Wide Area Network (WAN). Additionally or alternatively, other networks, such as Local Area Networks (LANs), can be used. Other configurations can include a network interface 130 communicating directly with the DMS 160 without a separate network. The network interface 130 may also communicate through various intermediaries, including a cellular base station 190, a satellite communication system 180, or a wire connection 185 to the Internet 150.

The DMS 160 provides an interface between the sensor network 140 that can be used by a human user or another system, by utilizing, for example, a graphical user interface (GUI) and/or an application programmable interface (API). The DMS 160 can collect and store information from the WSDs 110. The data communicated between the DMS 160 and the network interface 130 can be securely communicated in encrypted packets, and the DMS 160 can provide secure management of the collected data. In some embodiments, the DMS 160 may comprise a cellular network operator, such as Verizon®, AT&T®, and/or the like. It should be noted that in some embodiments, the sensor network 140 may operate independently from the DMS 160. In some embodiments, the DMS 160 may be eliminated altogether.

One or more of a variety of physical layers may be used to provide the wireless connections 120 of the sensor network 140. According to one embodiment, the WSDs 110 and network interface 130 communicate using a protocol stack based on IEEE 802.15.4 standard at 2.4 GHz using all 16 channels available in that standard. This physical layer enables the sensor network 140 to operate using very low power and/or predictable power consumption—which can be an important consideration for embodiments in which the WSDs 110 and/or network interface 130 operate on battery power. Nonetheless, other wireless technologies may be used, including IEEE 802.15.4 at 900 MHz; IEEE 802.11; Bluetooth®; IEEE 802.16; Ultra Wideband (UWB); 433 MHz Industrial, Scientific, and Medical (ISM) Band; cellular; optical; and more, using multiple RF channels (e.g., narrow-band frequency hopping) or a single RF channel. The network interface 130 can communicate with the Internet 150 through a wired connection and/or a wireless connection, as described above.

Figure 2:
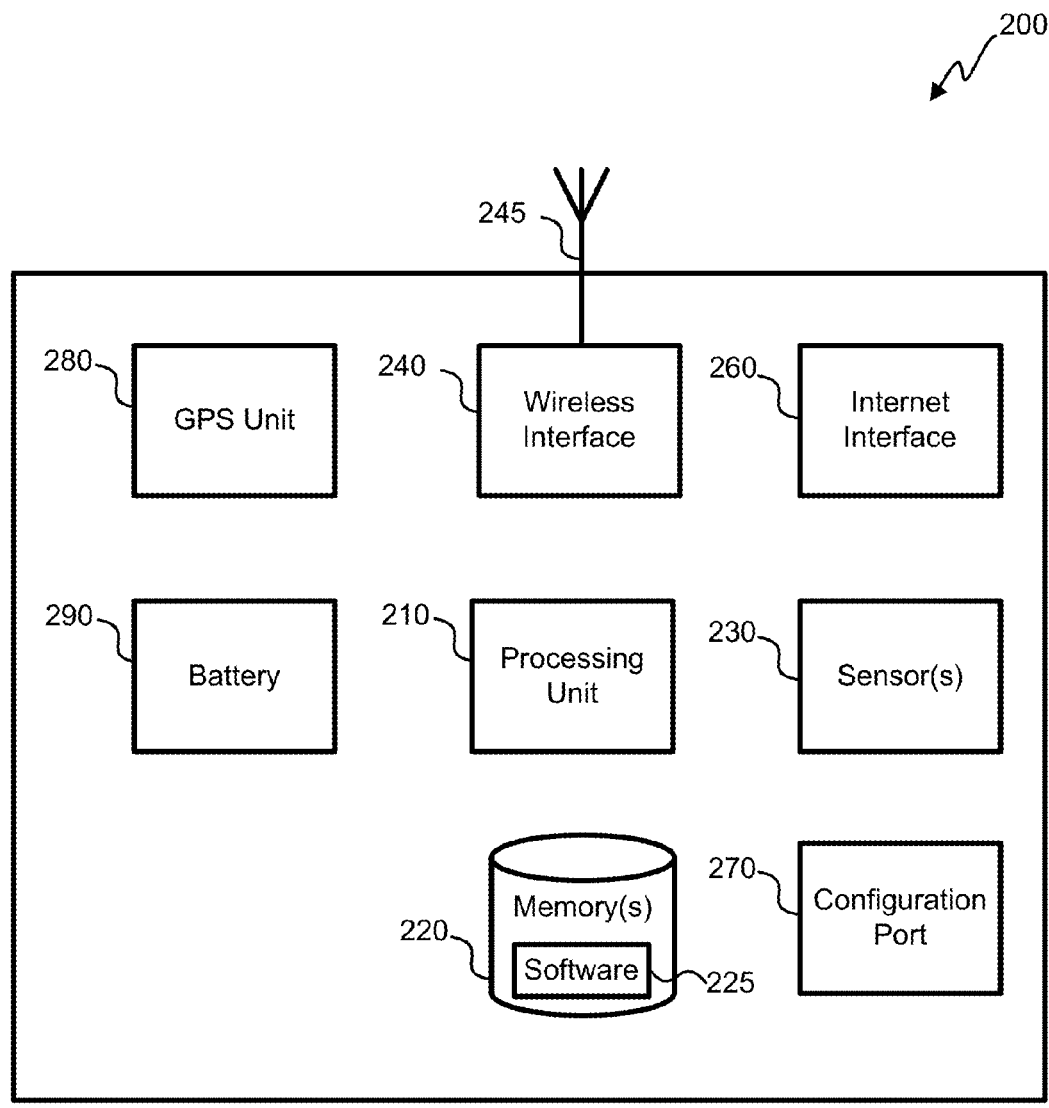
FIG. 2 illustrates a block diagram of a wireless sensor device, according to some embodiments.
Figure 7:
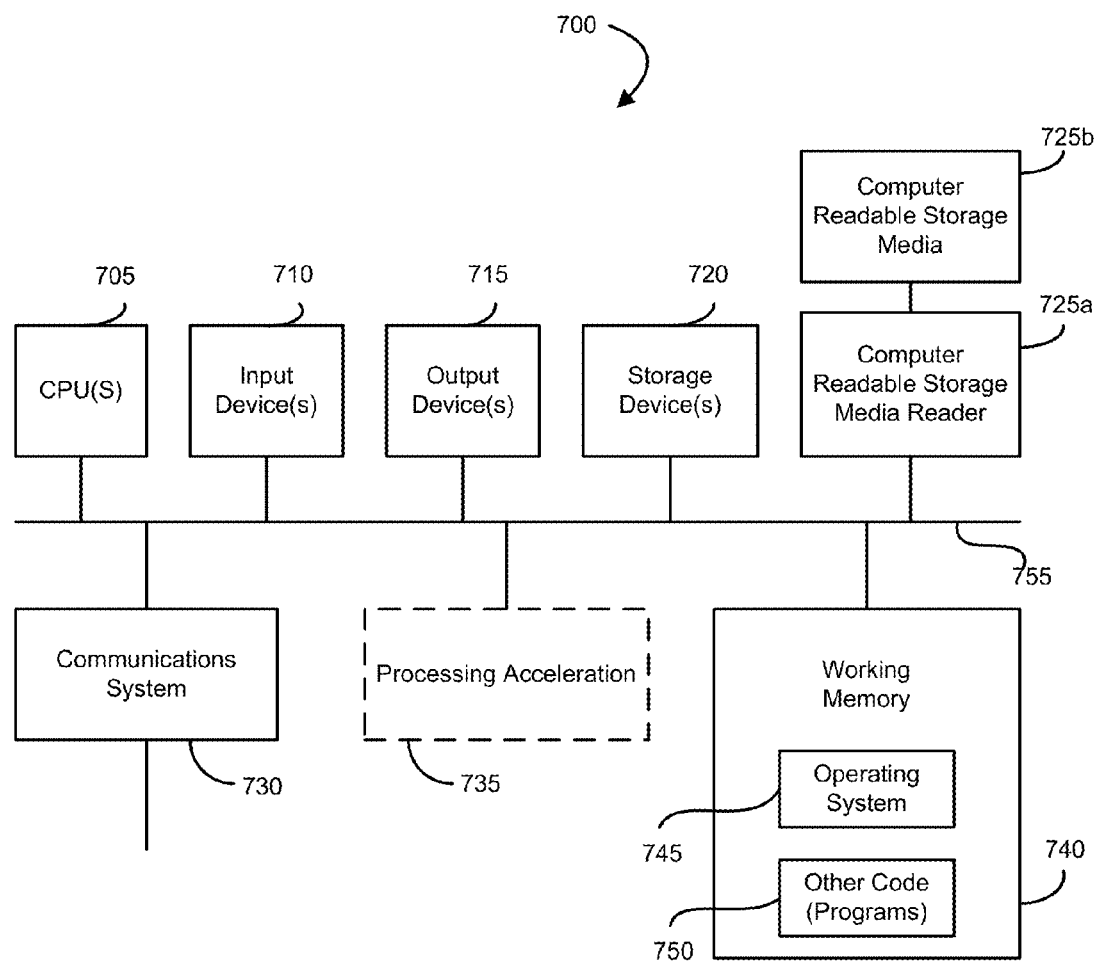
FIG. 7 illustrates a block diagram of an exemplary computer system in which embodiments of the present invention may be implemented.

The methods and systems described herein may be implemented using a general purpose computer system and/or a network computer environment, such as those described in relation to FIG. 7. In other embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. FIG. 2 represents an abstraction of the functions that may be implemented using these types of hardware. After reading this disclosure, one having skill in the art could use these well-known circuit elements to construct the device shown in FIG. 2 to implement these methods and systems.

FIG. 2 illustrates a block diagram of a WSD 200, according to some embodiments. This embodiment includes many components, such as sensor(s) 230 including microphones, cameras, ambient light detectors, user input devices, keyboards, and/or the like. The WSD 200 may also include one or more processing units 210, memories 220, and/or wireless interfaces 240. In some embodiments, the processing unit 210 can comprise a microprocessor and the memory 220 and software 225 can comprise programmed logic of the microprocessor. It can also be noted that the WSD 200 can include an interface (not shown) to provide a user with information. Such an interface can comprise a liquid-crystal display (LCD), one or more light emitting diodes (LEDs), etc.

WSD 200 may further include a battery 290. Because the wireless network can provide lower-power consumption, a battery having a long shelf life—such as an alkaline-, silver-oxide-, or lithium-based battery—can provide for operability of the WSD 200 without the need to change batteries for several years. According to one embodiment, a WSD 200 uses up to 4 A-size 3.6 volt (V) batteries, each battery rated at approximately 3600 milliamp hours (mAh). Some embodiments of the WSD 200 have an operating power of under 2 milliwatts (mW); other embodiments of the WSD operate under 1 mW. Therefore, depending on the battery's shelf life and capacity, as well as the configuration of the WSD 200, the WSD 200 can operate for 10 years or more without the need to change the battery.

The WSD 200 can also include a GPS unit 280 to provide location information. Location information can be particularly useful where a sensor network 140 is spread over a large physical area. Moreover, the GPS unit 280 further can be used to sense motion of the WSD 200 by determining, by the GPS unit 280 and/or the processing unit 210, a change in location over time. Additionally, the WSD 200 may include a configuration port 270, such as a USB port, micro USB port, serial port, and/or the like, that may be used to program the WSD 200 or otherwise receive configuration information. The WSD 200 may also include an Internet interface 260, such as an ethernet port. An antenna 245 may also be used to communicate with a gateway, a base station, satellite communication system, and/or another WSD 200 as described above.

In some embodiments, the various modules and systems in FIG. 2 may reside on separate chips and digital systems. Alternatively, multiple modules may be combined on the same or similar chips and digital systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Figure 3:
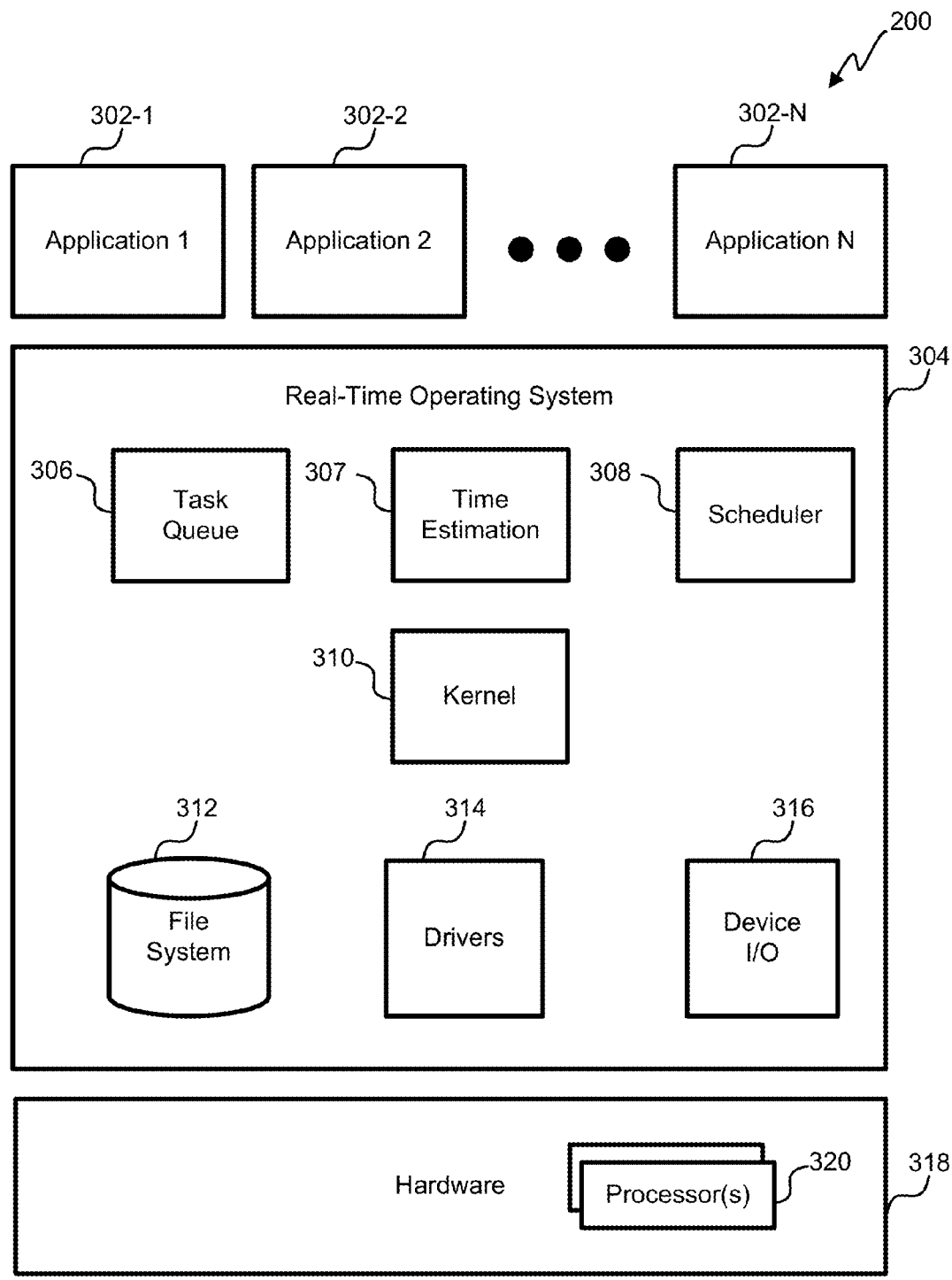
FIG. 3 illustrates a block diagram of a Real-Time Operating System (RTOS) for a wireless sensor device, according to some embodiments.

FIG. 3 illustrates a block diagram 300 of an RTOS 304 for a wireless sensor device, according to some embodiments. Like most other operating systems, the RTOS 304 exist as a layer of software between one or more software applications 302 and a hardware layer 318. The RTOS 304 may include a kernel 310, a file system interface 312, device drivers 314, and/or device I/O interfaces 316. The RTOS 304 may receive tasks from the one or more applications 302 and schedule them for execution on one or more processors 320 in the hardware layer 318. As used herein, the term "task" may refer to any process that can be scheduled by the RTOS 304. Therefore, a task may comprise a complete application, a thread, a pseudo-thread, and/or any other sequence of code to be executed by the one or more processors 320.

Many different methods currently exist for scheduling tasks on the RTOS 304. Two of the most prevalent include fixed or dynamic "priority scheduling" and "earliest deadline first" scheduling. Priority scheduling schedules tasks only according to a priority such that higher priority tasks are scheduled in front of lower priority tasks. Earliest deadline first scheduling schedules tasks according to an execution deadline, such that tasks with the earliest deadlines are scheduled first regardless of priority.

These and other known methods of scheduling tasks may perform adequately in some operating environments; however, each of these methods has significant drawbacks, particularly in environments with precision timing and latency management. These drawbacks may be especially pronounced in low-power environments where the one or more processors spend most of its time in a low-power sleep-mode. When the one or more processors periodically transitions to an active mode, tasks need to be scheduled in order to minimize context switching, interruptions, and interference with scheduled deadlines. For example, in a time division multiple access (TDMA) environment, explicit timing requirements may need to be implemented in order to communicate effectively over a wireless network.

In the case of priority scheduling, a task may already be executing when a higher priority task is received by the scheduler. This may cause the scheduler to preempt the executing task and cause a delay during the context switch to the higher priority task. If the RTOS does not support preemption, then the higher priority task can miss its execution deadline if received after a lower priority task is scheduled. Even in cases where the RTOS supports preemption, a new high-priority task can miss its execution deadline if a low priority task is currently holding a semaphore on mutually-exclusive or shared code. Therefore, priority scheduling by itself may not be suitable for all low-power wireless environments.

In the case of earliest deadline first scheduling, an execution interval is not considered, and tasks may thus be scheduled inefficiently. Additionally, earliest deadline first scheduling does not typically consider priority information. Therefore, a lower priority task with a more immediate deadline may cause a higher priority task to miss its deadline. This situation is unacceptable in low-power sensor networks. Therefore, earliest deadline first scheduling may similarly not be suitable for all low-power, wireless environments.

The embodiments described herein may utilize a new approach for scheduling tasks that utilizes a number of different factors. The RTOS 304 may include a scheduler 308 that is configured to receive tasks from the one or more applications 302 and schedule the tasks for execution on the one or more processors 320. The scheduler 308 may include or communicate with a time estimation module 307. The time estimation module 307 may include code that is configured to receive time interval estimations from the one or more applications 302. Alternatively or additionally, the time estimation module 307 may also include code that is configured to store and/or estimate an expected execution interval for tasks provided to the scheduler 308. The RTOS 304 may also include a task queue 306 that can be populated with scheduled tasks provided by the scheduler 308.

Figure 4:
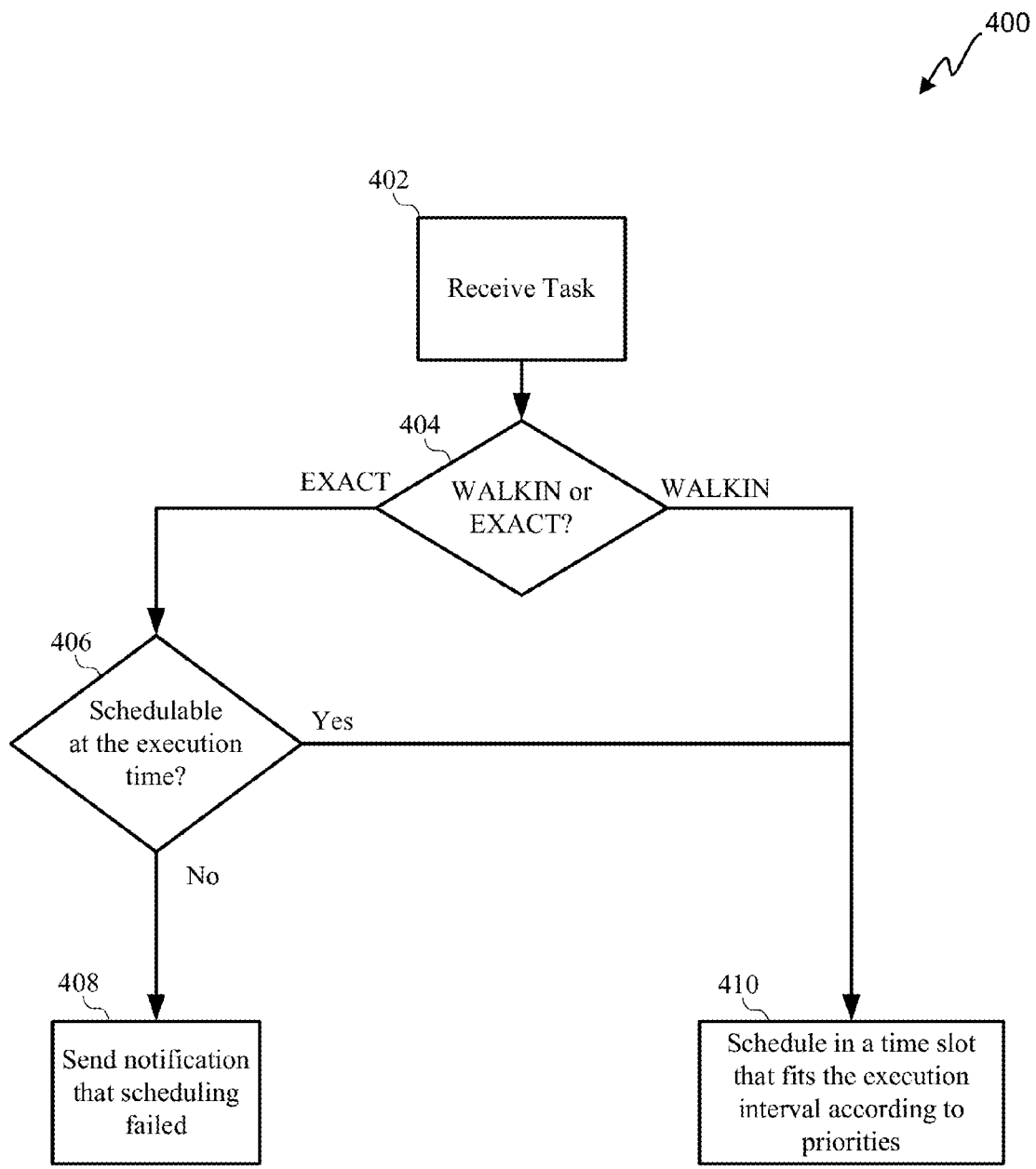
FIG. 4 illustrates a flowchart of a method for scheduling tasks in and RTOS, according to some embodiments.

FIG. 4 illustrates a flowchart 400 of a method for scheduling tasks in an RTOS, according to some embodiments. As described above, the embodiments described herein may categorize received tasks into two different groups, namely EXACT tasks and WALK-IN tasks. An EXACT task needs to be executed at a precise execution time. Note that the execution time can refer to either a required start time or a required completion time. For example, communication transmissions may include an execution time defining a required start time. Other tasks may require that a certain value be calculated by a required end time. A WALK-IN task can be executed at the earliest opportunity according to its priority.

In some embodiments, each task may be associated with a priority that indicates the priority of the task relative to other tasks. Each task may also be associated with an expected execution interval. As used herein, the term "expected execution interval" refers to a length of time expected for the one or more processors to execute the associated task. Additionally, each task may be associated with an execution time. As used herein, the term "execution time" indicates when the one or more processors should begin executing the associated task. The scheduler may use any of these values (priority, execution interval, and/or execution time) to schedule tasks for the one or more processors.

The method of flowchart 400 may include receiving a task (402). The task may be received from an application. The task may be received with a plurality of other tasks, or may be received individually. For example, upon transitioning out of a sleep state, a scheduler may receive a batch of tasks from a number of applications that need to be run during the current wake cycle of the one or more processors. When received as part of a plurality of tasks, each of the plurality of tasks may be individually scheduled by the scheduler. Additionally, the task may be received after a plurality of other tasks have already been scheduled by the scheduler. In some embodiments, the RTOS may disallow preemption, which will eliminate context switching delays. Instead of context switching, the RTOS can be run as a single thread.

Error! Bookmark not defined. The method may further include determining whether the task is a WALK-IN task or an EXACT task (404). In some embodiments, the task type may be identified by the sender. Alternatively, or additionally, the task type may be identified based on associated values received with the task. For example, an EXACT task may be identified when an execution time is received with the task.

For a WALK-IN task, the method may include scheduling the WALK-IN task in a timeslot that fits the execution interval of the WALK-IN task (410). In some embodiments, the WALK-IN task can be scheduled based on the execution interval combined with the priority. Because the scheduler knows approximately how long the task will take to execute, it can better schedule the task in relation to other tasks. In other words, the scheduler can find time intervals where the processor is awake and where higher priority tasks are already scheduled. The scheduler can also prioritize WALK-IN tasks in relation to EXACT tasks to ensure that a WALK-IN task scheduled in front of an EXACT task does not cause the EXACT task to miss its execution deadline. This is impossible to do unless the scheduler knows approximately how long the WALK-IN task will take to execute. Providing the execution interval for the task allows the scheduler to make intelligent decisions that best use processing resources and minimize or eliminate the need for preemption and context switching delays.

In some embodiments, the execution interval can be provided by the entity submitting the task to the scheduler. For example, an application may send the task with the execution interval. In some embodiments, a designer of the application can run the task on the processor prior to deployment and record an accurate estimate of the execution interval in the code of the application or in a memory on the wireless device.

The scheduler can receive the execution interval with the task, or the scheduler may receive the task and look up an associated execution interval in a memory.

In some embodiments, the execution interval may be estimated by the scheduler, the application, or by another software entity. For example, the execution interval may be estimated based on a length of code associated with the task. The execution interval may be estimated based on other parameters, such as a number of loops, branches, transmissions, memory accesses, and/or the like. Each of these code parameters can be associated with an estimated execution interval, which can then be aggregated to estimate a total execution interval for the task.

The expected execution interval can also be estimated based on the type of the task. For example, an execution interval for a TDMA transmission may be estimated based on the TDMA time slice intervals. A task with a predefined number of memory accesses may be estimated based on a known time interval for each memory access. A task with a static number of instructions and deterministic loop/branch statements can be estimated based on a known time interval for each operation.

In some embodiments, the expected execution interval can be estimated based on historical execution of the task. Each time the task is executed, the scheduler can record the total execution interval for the task. When the task is subsequently received in the future, the scheduler can use the recorded execution interval for the task as the estimated execution interval. Over time, the scheduler can record actual execution intervals for the task each time it is executed, and further refine the estimated execution interval based on these past statistics. In some embodiments, the estimated execution interval may represent an average execution interval. In some embodiments, the estimated execution interval may represent a longest or shortest measured execution interval. It will be understood that any statistical variation of the measured history of execution intervals may be used to determine an estimated execution interval each time the task is received.

In some embodiments, an initial estimated execution interval may be provided with the task, and the initial estimated execution interval can be refined over time based on actual execution intervals measured by the scheduler. For example, the task may have an initial estimated execution interval of 10 ms. However, the actual execution interval may be closer to 9 ms. The scheduler can take this discrepancy into account and refine the estimated execution interval such that it immediately or gradually shifts towards the actual execution time of 9 ms.

As described above, the expected execution interval may represent an average, shortest, or longest expected execution interval. In cases where execution interval overrun is undesirable, the longest, or maximum expected execution interval may be used in order to prevent scheduled tasks from missing their execution time. More optimistic scheduling situations may allow for the shortest execution interval to be used as the expected execution interval.

If it is determined that the received task represents an EXACT task, then the scheduler may determine whether the EXACT task is schedule at the indicated execution time (406). In some embodiments, an EXACT task may be distinguished from a WALK-IN task based on its association with an execution time. While a WALK-IN task can be scheduled at any time sufficient for its execution interval, an EXACT task is scheduled to begin/end at a specific execution time. An EXACT task will usually also be associated with a priority and/or an execution interval; however, neither of these additional values are required in every case.

In determining whether the EXACT task can be scheduled at the designated execution time, the scheduler can consider the priority of other tasks along with the expected execution intervals of each task. For example, if a number of higher priority tasks are already scheduled in front of the EXACT task, and the expected execution intervals of the higher priority tasks indicate that the higher priority tasks will still be executing at the specified execution time, then it may be determined that the EXACT task will miss its scheduled execution time. In another example, an EXACT task may already be scheduled at its execution time when a higher priority task is received. A higher priority EXACT task can take precedence over the lower priority EXACT task, and thereby bump the lower priority EXACT task from the scheduling queue. A higher priority WALK-IN task can be scheduled in front of a lower priority EXACT task. The execution interval of the higher priority WALK-IN task may be such that the lower priority EXACT task will be bumped from the scheduling queue.

Depending upon the embodiment, the scheduler can handle a scheduling failure for an EXACT task in different ways. As illustrated in flowchart 400, if it is determined that the EXACT task cannot be scheduled at the associated execution time, then a notification can be sent indicating that the scheduling failed (408). The notification may include information that describes other tasks that were given higher priority, the execution intervals of the other tasks, and/or by how much the EXACT task missed its execution time. This information may be used to calculate a new execution time. This information may also be used to provide feedback for a task designer such that the task can be redesigned to make scheduling easier. In response to the notification, the task can reschedule itself or produce an error message to be stored in an error log, transmitted to a monitoring station, provided to a user, and/or the like.

In some embodiments, the execution time may be associated with an acceptable delay window. For example, an execution time may be associated with a 5 ms delay window such that the associated EXACT task can be scheduled within 5 ms of the execution time. This may give the scheduler some leeway and allow the scheduler to schedule the EXACT task at a time near the execution time if it is within the acceptable delay window.

In some embodiments, the execution time 406 may represent the earliest time at which the EXACT task may be scheduled to run. This can instruct the scheduler to schedule the EXACT task at any point after the execution time. Alternatively or additionally, the execution time may represent a time before which the EXACT task needs to be scheduled. This can instruct the scheduler to schedule the EXACT task at any point prior to the execution time.

In some cases, instead of sending a notification that the scheduling failed, the EXACT task may be scheduled after all higher priority tasks have been scheduled. Although this may cause the EXACT task to miss its execution time, this may be acceptable in many cases.

In some embodiments, the EXACT task may be identified as a periodic EXACT task. In response, the scheduler may use the execution time for the first instance of the EXACT task, and then schedule the EXACT task periodically thereafter. An EXACT tasks may therefore be associated with a priority, an execution time, and execution interval, and/or and execution period. When an EXACT task is scheduled periodically, missing a scheduled execution time may be acceptable, so long as subsequent execution times in the periodic intervals can be scheduled. For example, a periodic EXACT task may sample an environmental sensor once every 5 seconds. If one instance of the periodic EXACT task is bumped from the schedule queue by higher priority tasks, the scheduler can simply disregard the bumped EXACT task instance and wait for the next scheduled instance of the EXACT task. Alternatively, other methods described above may also be used, such as sending a notification, scheduling the task at the next available time, and so forth.

It should be appreciated that the specific steps illustrated in FIG. 4 provide particular methods of scheduling tasks according to various embodiments of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5A:
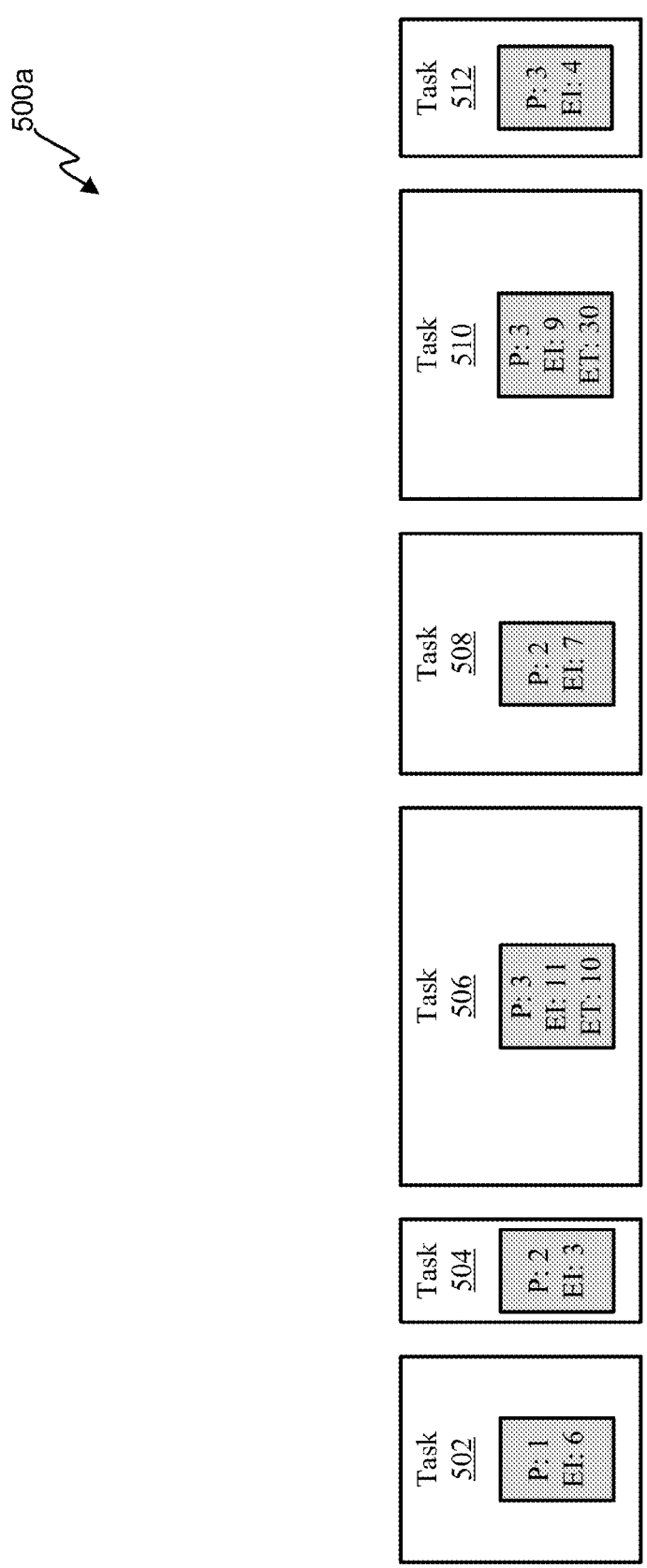
FIG. 5A illustrates a block diagram of exemplary tasks submitted to a scheduler, according to some embodiments.
Figure 5B:
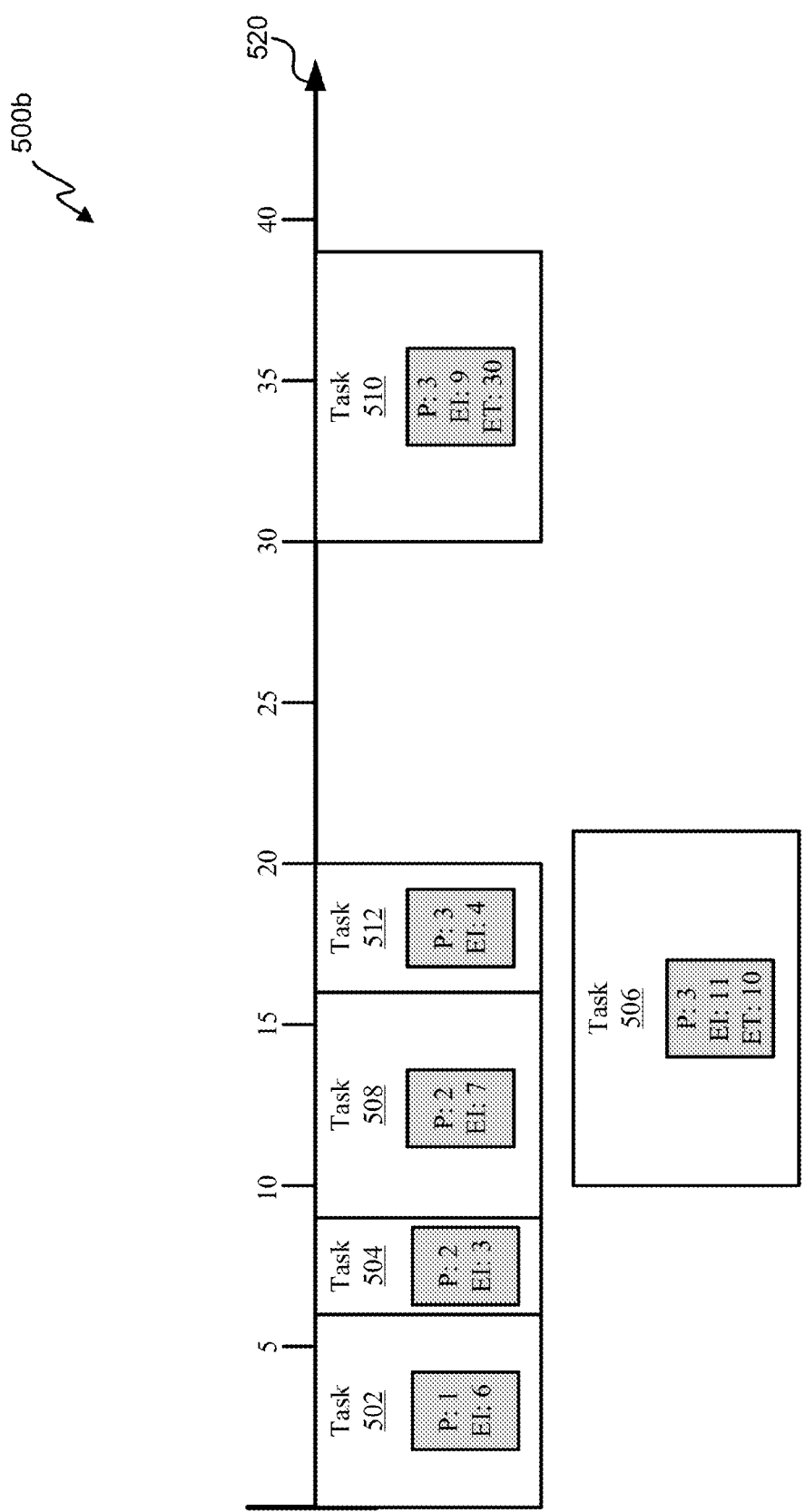
FIG. 5B illustrates a block diagram of tasks being scheduled, according to some embodiments.
Figure 5C:
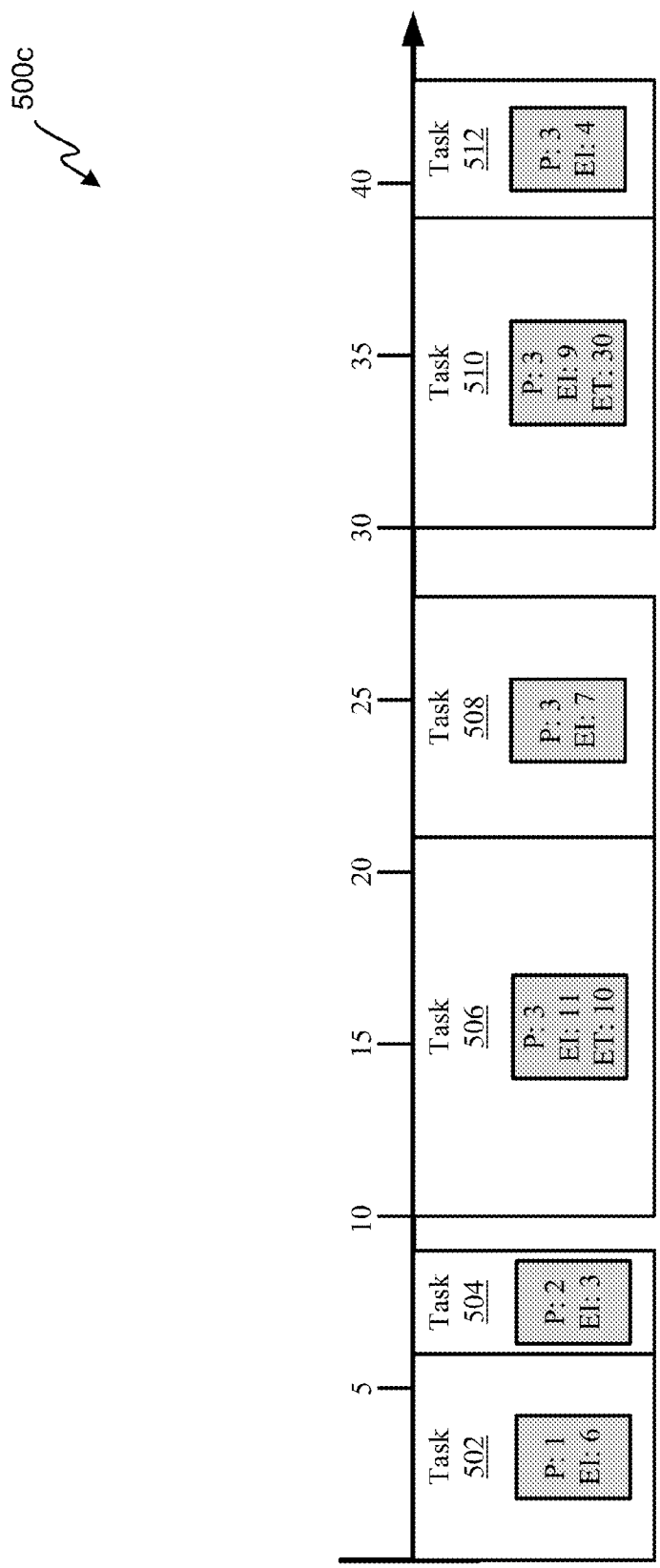
FIG. 5C illustrates a block diagram of tasks being scheduled, according to some embodiments.

The following description of FIGS. 5A-5C illustrates examples of scheduling WALK-IN tasks and EXACT tasks using execution intervals. FIG. 5A illustrates a block diagram 500a of exemplary tasks submitted to a scheduler, according to some embodiments. Each of the tasks represents either an exact task or a walk-in task. Both types of tasks include a priority (P) and an execution interval (EI). The exact tasks also include an execution time (ET). Task 502, task 504, task 508, and task 512 represent walk-in tasks. Task 506 and task 510 represent exact tasks. Note that in some embodiments additional information may also be included with each task in addition to that which is represented in diagram 500a. However, this information has been omitted in order to make the example of using priorities, execution intervals, and/or execution times more clear.

Note that the units used for the priority, execution time, and/or execution interval are to be interpreted relative to those of the other tasks. For example, a priority of 1 is higher than a priority of 2, which is higher than a priority of 3, and so forth. An execution interval of 6 indicates that task 502 is expected to take approximately 6 time units to execute. The time units can be any time unit, such as milliseconds, microseconds, and so forth. Similarly, an execution time of 10 indicates that task 506 should begin execution at time 10.

FIG. 5B illustrates a block diagram 500b of tasks being scheduled, according to some embodiments. A timeline 520 on which tasks can be scheduled by the scheduler is represented in FIG. 5B. If the tasks 502, 504, 506, 508, 510, 512 are received as a plurality of tasks in a batch, the scheduler can analyze the batch of tasks together. In one embodiment, the scheduler can first identify the highest priority exact tasks having a priority of 1. In this example, no exact tasks have a priority of one. Both exact tasks (task 506, task 510) have a lower priority of 3. In this case, the scheduler can then move to walk-in tasks with a priority of 1. For example, task 502 can be scheduled at time 0.

The scheduler can follow a similar algorithm for scheduling the remaining tasks. Specifically, the scheduler can next identify exact tasks with a priority of 2. As stated above, the only available exact tasks have a priority of 3. Next, the scheduler can identify walk-in tasks with a priority of 2. Therefore, task 504 and task 508 can be scheduled in any order. Because the scheduler knows the execution interval of task 502, the scheduler can schedule task 504 at time 6. Similarly, because the scheduler knows the execution interval of task 504 (3 time units), the scheduler can schedule task 508 for time 9. In some embodiments, task 504 and task 508 can be scheduled in any order. In other embodiments, task 504 and task 508 can be scheduled based on various factors, such as an execution interval where the longest/shortest execution interval is scheduled first.

Next, the scheduler can identify exact tasks with a priority of 3, including task 506 and task 510. Note that because the scheduler is aware of the execution interval for task 502, task 504, and task 508 that have already been scheduled, the scheduler will know that these three tasks will take until time 16 to finish execution. Therefore, task 506 will miss it scheduled execution time of time 10. In some embodiments, an indication can be sent to the sender of task 506 notifying the sender that task 506 was unsuccessfully scheduled and that an attempt should be made to reschedule task 506. Task 506 can include a callback function that can be executed by the scheduler in order to automatically reschedule or provide this notification. In other embodiments, task 506 can be scheduled at the next available time. Although not shown in FIG. 5B, task 506 could be scheduled at time 16 after task 508 has finished execution. Unlike task 506, task 510 can be scheduled at its associated execution time at time 30.

After scheduling the exact tasks at priority 3, the scheduler can next schedule any WALK-IN tasks having a priority of 3. In this embodiment, task 512 can be scheduled at the next available time, such as time 16. In other embodiments, task 512 could be scheduled after the most recently scheduled task. For example, although not explicitly shown in FIG. 5B, task 512 could be scheduled at time 39 after task 510 is expected to finish execution.

After scheduling all of the tasks, the scheduler can identify any gaps in the timeline during which the one or more processors can enter a sleep state. In FIG. 5B, there is a gap of 10 time units between task 512 and task 510. The scheduler can compare this 10 unit time gap to a threshold and determine whether it should schedule the one or more processors to go to sleep. In some embodiments, the scheduler can be instructed to maintain regular wake/sleep intervals and can adjust scheduling tasks accordingly.

FIG. 5C illustrates a block diagram 500c of tasks being scheduled, according to some embodiments. Diagram 500c use the same tasks described earlier in FIG. 5A and FIG. 5B, the difference being that task 508 has its priority changed from 2 to priority 3, and the scheduling order has been changed accordingly. In this example, task 502 and task 504 are scheduled in the same way as previously described. However, instead of scheduling task 508 (previously with a priority 2), the scheduler will first identify task 506 and task 508 as exact tasks having a priority of 3. Therefore, task 506 can be scheduled at its execution time of 10 and task 510 can be scheduled at its execution time of 30.

Next, the scheduler can identify the remaining walk-in tasks having a priority of 3. As described above, these can be scheduled in any order according to the parameters of different embodiments. In this particular example, task 508 is scheduled at time 21 to execute between task 506 and task 510. Task 512 is scheduled at time 39 after the execution of task 510 is scheduled to complete. In some embodiments, the scheduler may provide a mechanism to terminate at task at the end of the requested execution interval. This ensures that a task does not run beyond its scheduled time.

It should be noted, that the examples described above in relation to FIGS. 5A-5C are merely exemplary and not meant to be limiting. Different embodiments may use an execution interval, a priority, and/or an execution time to schedule tasks for an RTOS in different ways. For example, some embodiments may schedule exact tasks according to their execution time before examining priorities such that no task misses a scheduled execution time unless one or more exact tasks conflict based on their expected execution intervals. In light of this disclosure, one having skill in the art could alter the examples described above to meet the needs of each particular application in which embodiments are implemented.

Figure 6:
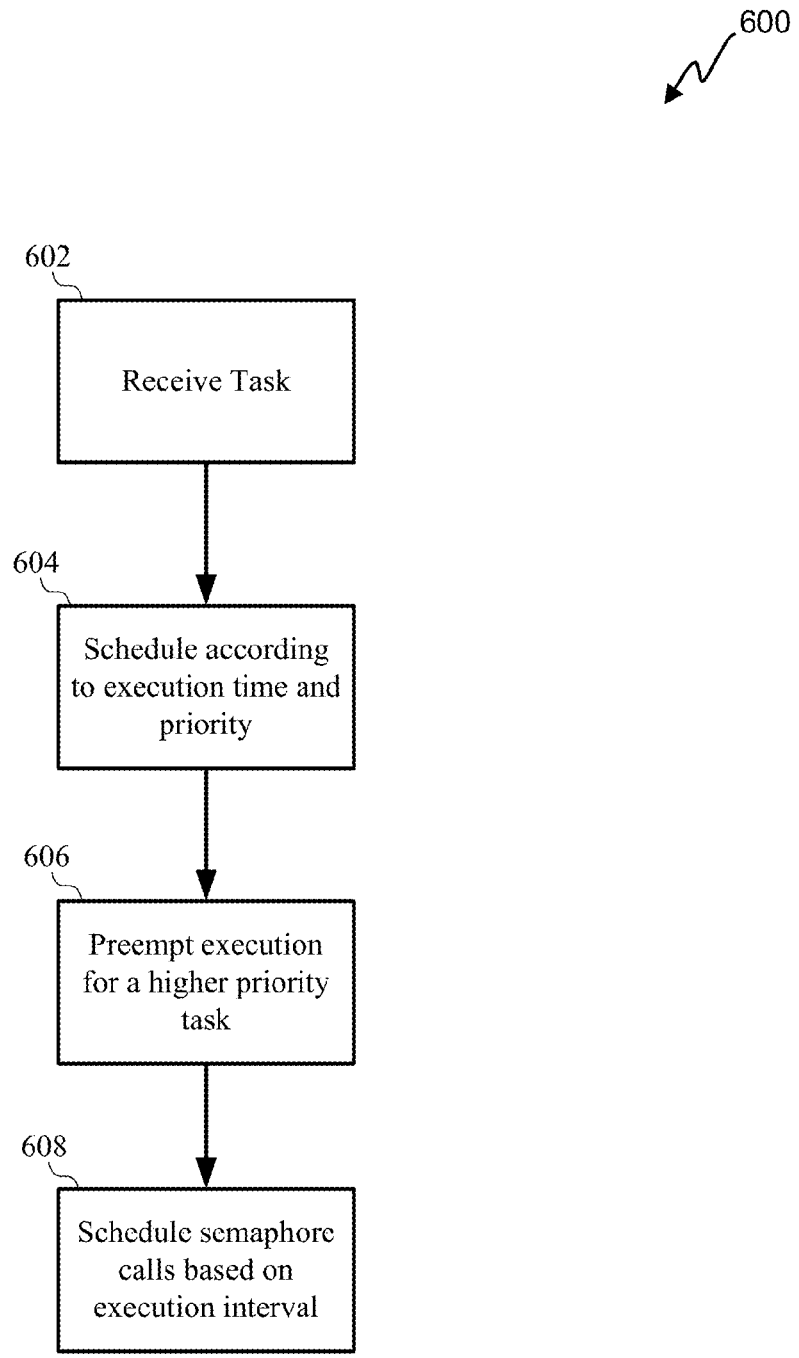
FIG. 6 illustrates a flowchart of a method for scheduling mutually exclusive code in a preemptive RTOS, according to some embodiments.

FIG. 6 illustrates a flowchart 600 of a method for scheduling mutually exclusive code in a preemptive real-time operating system, according to some embodiments. In some embodiments, the process described above for scheduling tasks in an RTOS can be used for environments where task preemption is not available or restricted. Generally, preemption refers to the situation where a task is currently executing on a processor, and before execution is completed, another task begins to execute. Switching between tasks that are not completed requires a context switch that adds a delay time to the overall processing of a batch of tasks.

However, execution intervals can also be used to schedule tasks in a preemptive environment. In the case of a preemptive environment, a task can be scheduled and executed according to its execution time and/or priority. These tasks can be scheduled without considering the execution intervals of certain tasks. Instead of having to schedule tasks one after another, higher priority tasks are allowed to preempt lower priority tasks. When a higher priority task needs to be executed, it can preempt a lower-priority task using a timer, an interrupt, and/or the like.

An execution interval can still be useful in scheduling access to mutually exclusive code in a preemptive environment. Generally, preempted tasks can call a semaphore to guard mutually exclusive code until execution has completed. When a task calls a semaphore to guard mutually exclusive code, the scheduling methods described above can be employed. In addition to scheduling task execution on the processor(s), access to mutually exclusive code can be scheduled using execution intervals. A task calling a semaphore can be treated as a walk-in task. The walk-in task may be associated with an execution interval and one or more resource IDs. The resource IDs can be used to identify resources or mutually exclusive sections of code. Generally, a task can advertise to the scheduler all of the resources required for its execution. The scheduler can then schedule access to the resource in the same manner described above using priorities, execution times, and/or execution intervals.

The method for scheduling access to mutually exclusive resources may include receiving a task (602). The task may be associated with a priority, an execution time, an execution interval, and/or one or more resource IDs. If the task can be scheduled without conflicts, then the task can be scheduled relative to other tasks as illustrated in FIGS. 5A-5B. if conflict exists, then the task may be scheduled to be preempted by, or to preempt another task. For example, turning back to FIG. 5B, task 508 could be scheduled at time 9, and task 506 could be scheduled to preempt task 508 at time 10. If no mutually exclusive code is shared between task 508 and task 506, then execution can continue as normal, with the one or more processors switching contexts back to task 508 at the completion of task 506. Therefore, the method may include preempting execution for a higher priority task and/or for an exact task (606).

However, if the task shares access to mutually exclusive code with another task, then the scheduler may schedule tasks according to their execution times, priorities, and/or execution intervals relative to a particular resource (608). Note that this is an exception to typical RTOS scheduling using semaphores. Instead, tasks are only executed when all the conditions are met, instead of scheduling a task and then dealing with resource management semaphores after the fact. In these embodiments, a resource may include a CPU, shared RAM, wireless communication resources, flash memory, "system-on-a-chip" peripherals or external devices, and/or the like. The list of requested resources can be part of the task attributes, which include priority, execution start time, execution duration, etc. Essentially, a scheduled task is guaranteed uninterrupted access to its list of required resources.

It should be appreciated that the specific steps illustrated in FIG. 6 provide particular methods of scheduling tasks according to various embodiments of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 7 illustrates an exemplary computer system 700, in which various embodiments of the present invention may be implemented. The system 700 may be used to implement any of the computer systems described above. The computer system 700 is shown comprising hardware elements that may be electrically coupled via a bus 755. The hardware elements may include one or more central processing units (CPUs) 705, one or more input devices 710 (e.g., a mouse, a keyboard, etc.), and one or more output devices 715 (e.g., a display device, a printer, etc.). The computer system 700 may also include one or more storage device 720. By way of example, storage device(s) 720 may be disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 725a, a communications system 730 (e.g., a modem, a network card (wireless or wired), an infra-red communication device, etc.), and working memory 740, which may include RAM and ROM devices as described above. In some embodiments, the computer system 700 may also include a processing acceleration unit 735, which can include a DSP, a special-purpose processor and/or the like.

The computer-readable storage media reader 725a can further be connected to a computer-readable storage medium 725b, together (and, optionally, in combination with storage device(s) 720) comprehensively representing remote, local, fixed, and/or removable storage devices plus storage media for temporarily and/or more permanently containing computer-readable information. The communications system 730 may permit data to be exchanged with the network 720 and/or any other computer described above with respect to the system 700.

The computer system 700 may also comprise software elements, shown as being currently located within a working memory 740, including an operating system 745 and/or other code 750, such as an application program (which may be a client application, web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed. Software of computer system 700 may include code 750 for implementing embodiments of the present invention as described herein.

Each of the methods described herein may be implemented by a computer system, such as computer system 700 in FIG. 7. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of scheduling tasks for a Real-Time Operating System (RTOS) in a low-power, wireless, mesh network, the method comprising:
    receiving, at a scheduler for the RTOS, a first plurality of tasks to schedule for execution by one or more processors and a second plurality of tasks for execution by the one or more processors, wherein:
        each task in the first plurality of tasks is:
            associated with an expected execution interval that indicates an expected length of time for the one or more processors to execute the task;
            associated with a list of resource identifiers that identify resources required to execute each of the first plurality of tasks; and
            associated with an execution time that indicates when the task should begin execution by the one or more processors; and each task in the second plurality of tasks is:
  associated with an expected execution interval that indicates an expected length of time for the one or more processors to execute the task;
  associated with a list of resource identifiers that identify resources required to execute each of the second plurality of tasks; and
  not associated with an execution time that indicates when the task should begin or end execution by the one or more processors, such that the task can be scheduled at any time when the expected execution interval is available at the one or more processors;
scheduling the first plurality of tasks for execution by the one or more processors such that each of the first plurality of tasks is scheduled to begin at the task's respective execution time;
scheduling the second plurality of tasks for execution by the one or more processors such that each of the second plurality of tasks is scheduled in a time interval left after scheduling the first plurality of tasks that is at least as long the task's associated expected execution interval;
receiving a walk-in task that has a list of resource identifiers that identify resources required for execution of the walk-in task, wherein the list of resources comprises a reference to at least one mutually exclusive section of code;
searching the list of resource identifiers for each task in the first plurality of tasks for references to the at least one mutually exclusive section of code;
searching the list of resource identifiers for each task in the second plurality of tasks for references to the at least one mutually exclusive section of code; and
scheduling the walk-in task for execution by the one or more processors such that:
  the walk-in task can be preempted by ones of the first plurality of tasks and ones of the second plurality of tasks that do not include a reference to the at least one mutually exclusive section code in their respective lists of resource identifiers; and
  the walk-in task is not preempted by ones of the first plurality of tasks and ones of the second plurality of tasks that do include a reference to the at least one mutually exclusive section code in their respective lists of resource identifiers.

2. The method of claim 1, further comprising:
determining that a task in the first plurality of tasks cannot be scheduled to begin execution at the task's execution time; and
executing a callback function to provide a notification that the task cannot be scheduled to begin execution at the task's execution time.

3. The method of claim 1, wherein:
each of the first plurality of tasks is associated with respective priorities;
each of the second plurality of tasks is associated with respective priorities;
the walk-in task is associated with a priority;
each of the second plurality of tasks are scheduled for execution by the one or more processors according to their respective priorities;
each of the second plurality of tasks are scheduled for execution by the one or more processors according to their respective priorities;
the walk-in task is scheduled according to its priority; and
scheduling the walk-in task causes one of the first plurality of tasks to miss its associated execution time.

4. The method of claim 1, wherein:
a first task is associated with a priority;
the priority indicates a scheduling priority relative to other tasks; and
the first task is scheduled using the priority.

5. The method of claim 1, wherein the expected execution interval of one of the first plurality of tasks is provided to the scheduler by an application associated with the one of the first plurality of tasks.

6. The method of claim 1, wherein:
the RTOS allows preemption;
a first task declares a resource identifier for a first resource; and
the first task is scheduled to use the first resource based on the first task's expected execution time.

7. A low-power wireless sensor device running a Real-Time Operating System (RTOS), the sensor device comprising:
a wireless communication module;
one or more processors; and
a memory having instructions stored thereon which, when executed by the one or more processors, cause the one or more processors to perform operations including:
  receiving, at a scheduler for the RTOS, a first plurality of tasks to schedule for execution by one or more processors and a second plurality of tasks for execution by the one or more processors, wherein:
    each task in the first plurality of tasks is:
      associated with an expected execution interval that indicates an expected length of time for the one or more processors to execute the task;
      associated with a list of resource identifiers that identify resources required to execute each of the first plurality of tasks; and
      associated with an execution time that indicates when the task should begin execution by the one or more processors; and
    each task in the second plurality of tasks is:
      associated with an expected execution interval that indicates an expected length of time for the one or more processors to execute the task;
      associated with a list of resource identifiers that identify resources required to execute each of the second plurality of tasks; and
      not associated with an execution time that indicates when the task should begin or end execution by the one or more processors, such that the task can be scheduled at any time when the expected execution interval is available at the one or more processors;
  scheduling the first plurality of tasks for execution by the one or more processors such that each of the first plurality of tasks is scheduled to begin at the task's respective execution time;
  scheduling the second plurality of tasks for execution by the one or more processors such that each of the second plurality of tasks is scheduled in a time interval left after scheduling the first plurality of tasks that is at least as long the task's associated expected execution interval;
  receiving a walk-in task that has a list of resource identifiers that identify resources required for execution of the walk-in task, wherein the list of resources comprises a reference to at least one mutually exclusive section of code;

searching the list of resource identifiers for each task in the first plurality of tasks for references to the at least one mutually exclusive section of code;
searching the list of resource identifiers for each task in the second plurality of tasks for references to the at least one mutually exclusive section of code; and
scheduling the walk-in task for execution by the one or more processors such that:
the walk-in task can be preempted by ones of the first plurality of tasks and ones of the second plurality of tasks that do not include a reference to the at least one mutually exclusive section code in their respective lists of resource identifiers; and
the walk-in task is not preempted by ones of the first plurality of tasks and ones of the second plurality of tasks that do include a reference to the at least one mutually exclusive section code in their respective lists of resource identifiers.

8. The device of claim 7, wherein the instructions cause the one or more processors to perform further operations including:
determining that the a task in the first plurality of tasks cannot be scheduled to begin execution at the task's execution time; and
executing a callback function to provide a notification that the task cannot be scheduled to begin execution at the task's execution time.

9. The device of claim 7, wherein:
each of the first plurality of tasks is associated with respective priorities;
each of the second plurality of tasks is associated with respective priorities;
the walk-in task is associated with a priority;
each of the second plurality of tasks are scheduled for execution by the one or more processors according to their respective priorities;
each of the second plurality of tasks are scheduled for execution by the one or more processors according to their respective priorities;
the walk-in task is scheduled according to its priority; and
scheduling the walk-in task causes one of the first plurality of tasks to miss its associated execution time.

10. The device of claim 7, wherein:
a first task is associated with a priority;
the priority indicates a scheduling priority relative to other tasks; and
the first task is scheduled using the priority.

11. The device of claim 7, wherein the expected execution interval of one of the first plurality of tasks is provided to the scheduler by an application associated with the one of the first plurality of tasks.

12. The device of claim 7, wherein:
the RTOS allows preemption;
a first task declares a resource identifier for a first resource; and
the first task is scheduled to use the first resource based on the first task's expected execution time.

13. A non-transitory, computer-readable storage medium having instructions stored thereon which, when executed by one or more processors, cause the one or more processors to perform operations including:
receiving, at a scheduler for the RTOS, a first plurality of tasks to schedule for execution by one or more processors and a second plurality of tasks for execution by the one or more processors, wherein:
each task in the first plurality of tasks is:
associated with an expected execution interval that indicates an expected length of time for the one or more processors to execute the task;
associated with a list of resource identifiers that identify resources required to execute each of the first plurality of tasks; and
associated with an execution time that indicates when the task should begin execution by the one or more processors; and
each task in the second plurality of tasks is:
associated with an expected execution interval that indicates an expected length of time for the one or more processors to execute the task;
associated with a list of resource identifiers that identify resources required to execute each of the second plurality of tasks; and
not associated with an execution time that indicates when the task should begin or end execution by the one or more processors, such that the task can be scheduled at any time when the expected execution interval is available at the one or more processors;
scheduling the first plurality of tasks for execution by the one or more processors such that each of the first plurality of tasks is scheduled to begin at the task's respective execution time;
scheduling the second plurality of tasks for execution by the one or more processors such that each of the second plurality of tasks is scheduled in a time interval left after scheduling the first plurality of tasks that is at least as long the task's associated expected execution interval;
receiving a walk-in task that has a list of resource identifiers that identify resources required for execution of the walk-in task, wherein the list of resources comprises a reference to at least one mutually exclusive section of code;
searching the list of resource identifiers for each task in the first plurality of tasks for references to the at least one mutually exclusive section of code;
searching the list of resource identifiers for each task in the second plurality of tasks for references to the at least one mutually exclusive section of code; and
scheduling the walk-in task for execution by the one or more processors such that:
the walk-in task can be preempted by ones of the first plurality of tasks and ones of the second plurality of tasks that do not include a reference to the at least one mutually exclusive section code in their respective lists of resource identifiers; and
the walk-in task is not preempted by ones of the first plurality of tasks and ones of the second plurality of tasks that do include a reference to the at least one mutually exclusive section code in their respective lists of resource identifiers.

14. The non-transitory, computer-readable storage medium of claim 13 wherein:
each of the first plurality of tasks is associated with respective priorities;
each of the second plurality of tasks is associated with respective priorities;
the walk-in task is associated with a priority;
each of the second plurality of tasks are scheduled for execution by the one or more processors according to their respective priorities;
each of the second plurality of tasks are scheduled for execution by the one or more processors according to their respective priorities;

the walk-in task is scheduled according to its priority; and
scheduling the walk-in task causes one of the first plurality of tasks to miss its associated execution time.

15. The method of claim 1, wherein the expected execution interval of one of the first plurality of tasks is estimated by the scheduler based on previous execution times of the one of the first plurality of tasks.

16. The device of claim 7, wherein the expected execution interval of one of the first plurality of tasks is estimated by the scheduler based on previous execution times of the one of the first plurality of tasks.

17. The non-transitory, computer-readable storage medium of claim 13, wherein the expected execution interval of one of the first plurality of tasks is estimated by the scheduler based on previous execution times of the one of the first plurality of tasks.

18. The non-transitory, computer-readable storage medium of claim 13, wherein the instructions cause the one or more processors to perform further operations including:
   determining that a task in the first plurality of tasks cannot be scheduled to begin execution at the task's execution time; and
   executing a callback function to provide a notification that the task cannot be scheduled to begin execution at the task's execution time.

* * * * *